(12) United States Patent
Sweet et al.

(10) Patent No.: US 11,373,132 B1
(45) Date of Patent: Jun. 28, 2022

(54) FEATURE SELECTION SYSTEM

(71) Applicant: Accenture Global Solutions Limited, Dublin (IE)

(72) Inventors: Julie Sweet, Arlington, VA (US); Bhaskar Ghosh, Bengaluru (IN); Rajendra Prasad Tanniru, Basking Ridge, NJ (US); Soumala Sarkar, Bangalore (IN); Koushik M. Vijayaraghavan, Chennai (IN); Vivek Krishnan, Chennai (IN); Purnima Jagannathan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/584,081

(22) Filed: Jan. 25, 2022

(51) Int. Cl.
*G06Q 10/00* (2012.01)
*G06Q 10/06* (2012.01)
*G06F 40/40* (2020.01)
*G06K 9/62* (2022.01)
*G06Q 10/10* (2012.01)

(52) U.S. Cl.
CPC ....... *G06Q 10/06375* (2013.01); *G06F 40/40* (2020.01); *G06K 9/6261* (2013.01); *G06Q 10/103* (2013.01)

(58) Field of Classification Search
None
See application file for complete search history.

(56) References Cited

U.S. PATENT DOCUMENTS

| | | | |
|---|---|---|---|
| 9,355,375 B2 | 5/2016 | Knospe et al. | |
| 11,144,185 B1 | 10/2021 | Dinga et al. | |
| 11,216,168 B2 | 1/2022 | Sarang et al. | |
| 11,238,082 B2 | 2/2022 | Radhakrishnan et al. | |
| 2015/0039292 A1* | 2/2015 | Suleman | G06F 40/35 704/9 |
| 2020/0074321 A1* | 3/2020 | Chungapalli | G06N 20/20 |
| 2020/0356878 A1* | 11/2020 | Lakshmipathy | G06N 5/003 |
| 2020/0356900 A1* | 11/2020 | Briancon | G06N 5/022 |
| 2021/0073291 A1* | 3/2021 | Hunter | G06F 9/44505 |
| 2021/0081377 A1* | 3/2021 | Polled | G06N 20/00 |
| 2021/0112154 A1* | 4/2021 | Rodriguez | H04W 72/02 |
| 2021/0125154 A1* | 4/2021 | Lewis | G06F 40/40 |
| 2021/0342541 A1* | 11/2021 | Taylor | G06F 16/3328 |
| 2022/0067520 A1* | 3/2022 | Dalli | G06N 3/006 |
| 2022/0108262 A1* | 4/2022 | Celia | G06Q 10/063118 |
| 2022/0138656 A1* | 5/2022 | Le | G06N 5/045 706/45 |

OTHER PUBLICATIONS

Linardatos, Pantelis, Explainable Al: A Review of Machine Learning Interpretability Methods, 2020, Entropy 2021, p. 1-45 (Year: 2020).*

* cited by examiner

*Primary Examiner* — Joseph M Waesco

(74) *Attorney, Agent, or Firm* — Fish & Richardson P.C.

(57) ABSTRACT

This document describes a computer-implemented method that includes receiving, over a network, at least one of text, audio, image, or video data associated with an entity of interest; identifying, based on the received data, a set of entity-specific candidate features; loading a feature library comprising a plurality of features that are each assigned to one or more feature spaces; and selecting, using a feature selection engine, one or more features from each of the feature spaces based on the set of entity-specific candidate features.

10 Claims, 4 Drawing Sheets

FEATURE SELECTION SYSTEM

BACKGROUND

Generally speaking, products and services can be defined in terms of their features. Features often include a numerical metric. For complex products and services, network-based platforms can be used to identify and continuously track the growing number of relevant features and metrics.

SUMMARY

This specification generally describes a system that processes information from data sources using natural language processing to identify a set features specific to an entity, e.g., a company. A feature selection engine uses machine learning techniques to select relevant features from a feature library based on the entity-specific features. The selected features can be displayed on a user interface, e.g., for editing and updating the features.

In general, one innovative aspect of the subject matter described in this specification can be embodied in methods that include the actions of receiving, over a network, at least one of text, audio, image, or video data associated with an entity of interest; identifying, based on the received data, a set of entity-specific candidate features; loading a feature library that includes a plurality of features that are each assigned to one or more feature spaces; and selecting, using a feature selection engine, one or more features from each of the feature spaces based on the set of entity-specific candidate features. Other implementations of this aspect include corresponding systems, apparatus, and computer programs, configured to perform the actions of the methods, encoded on computer storage devices.

These and other implementations can each optionally include one or more of the following features.

In some implementations, identifying the set of entity-specific candidate features includes extracting text from the text, audio, image, or video data associated with the entity; and creating, using a natural language processing (NLP) model, vectors of feature-related words based on the usage and context of the words in the data associated with the entity.

In some implementations, the operations include receiving, over a network, at least one of text, audio, image, or video data associated with a plurality of entities; identifying, based on the received data, an entity domain including the entity of interest and a plurality of additional entities; and loading a set of domain-specific candidate features from a domain-specific feature library, wherein the feature selection engine selects the one or more features from each of the feature spaces based on the set of entity-specific candidate features and the set of domain-specific candidate features.

In some cases, the operations can include assigning, using explainable AI technology, a weighted score to each of the selected features; and filtering the selected features based on the weighted score.

In some implementations, the feature selection engine selects, at a first time, a first feature set including one or more features from each of the feature spaces based on the set of entity-specific candidate features; and the feature selection engine selects, at a second time after the first time, a second feature set including one or more features from each of the feature spaces based on the set of entity-specific candidate features and the set of domain-specific candidate features.

In some implementations, each of the loaded domain-specific candidate features further includes a baseline measure, and the operations include, for each of the selected features, identifying a baseline measure based on the baseline measures of the domain-specific candidate features.

In some implementations, the operations can include identifying one or more custom features comprised by the set of entity-specific candidate features or the set of domain-specific candidate features and not comprised by the feature library; and storing the one or more custom features in the feature library.

In some implementations, the operations can include generating a visualization that presents, for each feature space, both the features selected by the feature selection engine and one or more unselected features; receiving user input selecting or unselecting one or more of the features; and updating, based on the user input, the selected features.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
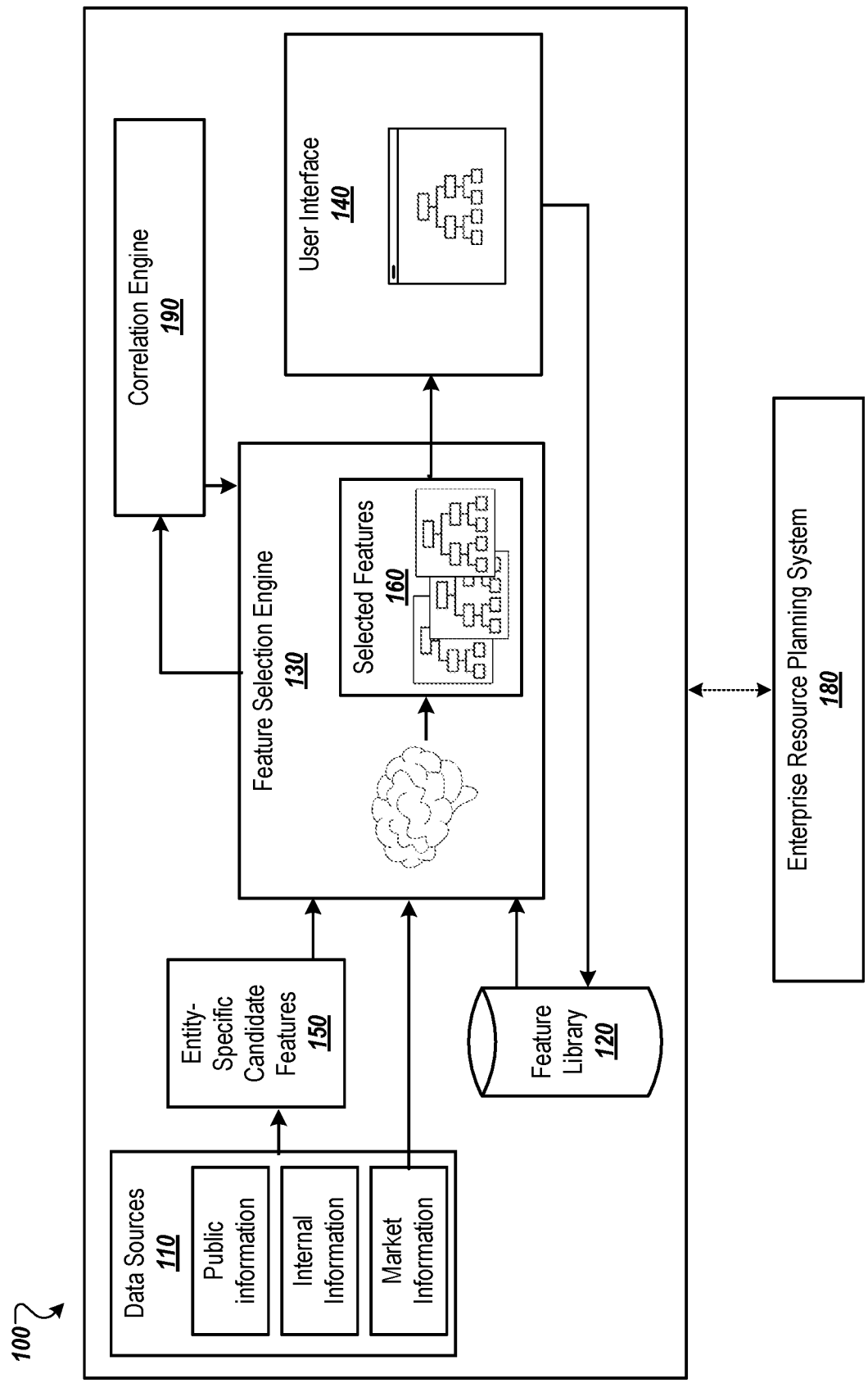
FIG. 1 depicts an example system for selecting features.

In most technical and commercial contexts, "success" has traditionally been defined in terms of numerical metrics that are often written into a client-vendor contract or service level agreement. The parties to such an agreement were generally able to assess whether the cooperation had been a success. In recent years, there has been a change in perspective that the parties to such an agreement bear responsibilities towards other stakeholders, e.g., and shareholders, employees, customers, and suppliers, who are not party to the contractual agreement, as well as to the public. While the parties may continue to define success in numerical terms, the expectations of the other stakeholders are beginning to shape client-vendor relationships.

For example, a tire manufacturer and a car manufacturer may have an agreement in which the tire manufacturer supplies the car manufacturer with tires for a certain model. Traditionally, the agreement may have dictated performance metrics, such as braking distance, and financial metrics such as price per unit. However, with the advent of electric cars, the number of metrics may increase to include, e.g., road noise requirements that can impact the design of the tread pattern and choice of material. Additionally, electric cars may imply certain expectations regarding sustainability from external stakeholders that also affect the choice of material as well as how the tire is manufactured. When faced with a sudden increase in complexity and shifting priorities, the parties may overemphasize some focus areas at the expense of others, leading to an incomplete or unbalanced overview of the engineering project.

Similar issues may also be faced in commercial contexts, e.g., in the field of consulting. While consultants were traditionally engaged to improve financial metrics, there is now an expectation of simultaneously improving performance in a variety of ways. At the start of an engagement, management personnel from the client meet with senior consultants to identify areas of improvement, actions and measures for improving in these areas, and metrics for measuring the improvements. Generally, the client articulates the areas of improvement, and the consultants suggest actions, measures, and metrics. When faced with a variety of potential issues, the upper management of the client may be overly focused on one specific area, such as diversity or sustainability, e.g., due to a series of negative public relations incidents. Conversely, senior consultants may have a pronounced preference to track improvements through particular metrics that are familiar from past engagements with other clients.

Thus, there is a need for a flexible and robust tool to pinpoint and track a balanced set of expectations for numerous projects. In the present disclosure, expectations can be defined in terms features, e.g., objectives, actions, and metrics. More specifically, the present disclosure describes a collection of feature trees that each contain structured client-relevant information and how the collection is leveraged to identify features for an individual client using artificial intelligence. As illustrated by the examples, feature trees apply to a variety of contexts and situations. In addition to offering a balanced spectrum of actions and metrics, implementations of the present disclosure may be suitable for automated tracking and may even interface with a client's operational systems (e.g., enterprise resource planning systems) for automatically implementing the identified actions as part of client operations.

FIG. 1 depicts an example system 100 for selecting features. The example system 100 includes data sources 110, a feature library 120, a feature selection engine 130, and a user interface 140. As described below in more detail, the data sources 110 can include public and/or internal information associated with an entity of interest. Information from the data sources 110 is used to compile a list 150 of entity-specific candidate features. The feature selection engine 130 can be used to select one or more features 160 loaded from the feature library 120. In some instances, the feature library 120 includes a plurality of feature trees that each belong to a feature space or focus area. As described below in more detail, some implementations of the system 100 are configured to exchange data with an enterprise resource planning system 180 or other information consumer. In some implementations, the system 100 can also include a correlation engine 190.

A feature tree can be used to structure information according to a hierarchy. For example, a feature tree may group the features of the aforementioned electric car, e.g., into the groups of chassis, powertrain, battery, electronics, and vehicle interior. Each of these groups may be broken down into sub-groups of increasing levels of detail. For a tire, the feature tree may include, e.g., the groups of tread pattern, construction, and rubber composition. Software architecture can be similarly broken down into a hierarchy of subsystems. In some instances, each node of the feature tree may be associated with one or more numerical metrics. For example, a battery of an electric car may need to provide a range of travel measured in miles or kilometers or weigh less than a certain limit. Thus, a feature tree provides a standardized format for storing information. For instance, the previously mentioned car manufacturer may have feature trees for every configuration for every vehicle. The collection of feature trees may be stored on a plurality of network-based, non-transitory storage devices that form the feature library 120 of FIG. 1.

Figure 2:
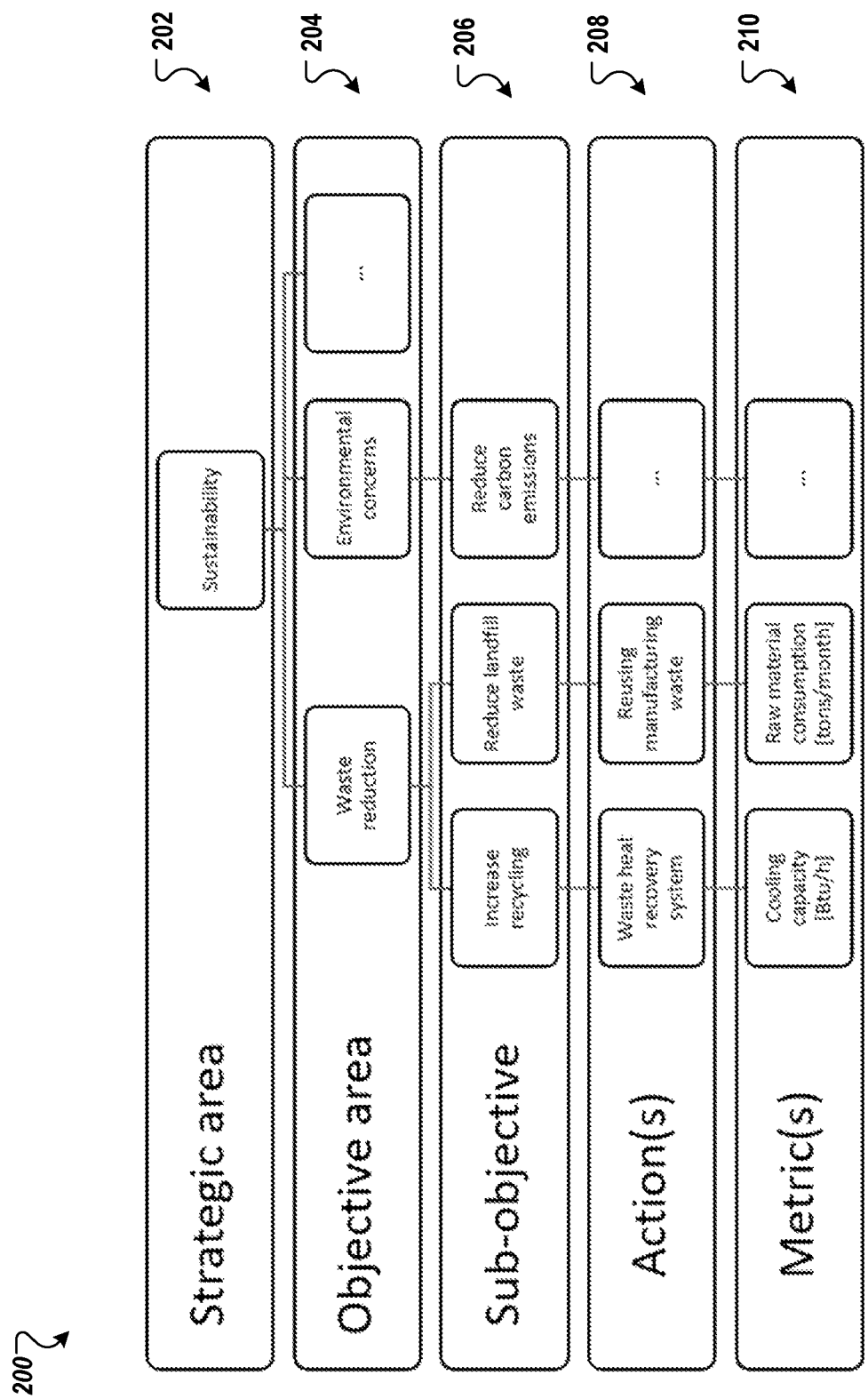
FIG. 2 depicts an example feature tree.

In some cases, the hierarchy of the feature tree may indicate a relationship between parts of a system beyond straightforward structural relationships. FIG. 2 depicts an example value tree 200 that links strategic objectives to metrics through a hierarchy of sub-objectives and transformative actions. For example, a strategic area 202 of sustainability can be broken down into several objectives 204, such as waste reduction and environmental concerns. Each objective area 204 encompasses one or more sub-objectives 206. For example, waste reduction may encompass both an increase in recycling and a reduction in landfill waste. Environmental concerns may encompass reducing carbon emissions. As indicated by the ellipses, specific implementations of the value tree may include further nodes and branches that are omitted from the figure for the sake of clarity.

The sub-objectives can be achieved through specific client actions 208 that are measured using metrics 210. In some instances, the top levels 204-206 of the value tree are universal (e.g., across an entire sector), while the actions and metrics may be specific to certain industries or even to certain companies. For example, manufacturing companies may increase recycling in some instances by installing waste heat recovery systems that capture heat generated by one manufacturing process and use the heat to power a refrigeration cycle that cools another part of the manufacturing system. The efforts associated with this type of recycling can be measured, e.g., by the cooling capacity offered by the waste heat recovery system. However, this type of action may only be relevant for mass production, as opposed to niche production that relies on 3D printing. Such operations may implement other actions to increase recycling, e.g., using reusable packaging within the supply chain. If this sub-objective is considered for the IT security sector instead of the manufacturing sector, neither of these targeted actions may be appropriate.

Even within the manufacturing sector, the actions shown in FIG. 2 are only examples. In some instances, it may be appropriate to analyze and modify existing manufacturing lines to decrease the waste heat rejected to the environment, as opposed to simply increasing the cooling capacity. Similarly, it may be appropriate to analyze machine settings and tolerances to reduce the number of reject parts, as opposed to simply focusing on the recycling of such parts. These additional actions are related, e.g., to a further strategic area of modernizing or improving the technical aspects of the manufacturing process, which is not—as such—a sustainability goal. Nonetheless, this example shows that actions and metrics are specific and may relate to multiple dimensions or strategic areas.

Although the example value tree 200 is depicted with five hierarchy levels, other examples may include additional levels. For example, some actions can be broken down into a hierarchy of sub-tasks. In some cases, a particular action may be tied to multiple alternative metrics. The metrics may be associated with baseline values and target values based on industry information or on past engagements.

For a given engagement or project, a set of feature trees (e.g., selected features 160 in FIG. 1) can represent relevant target areas, actions, and metrics in a structured manner. In some instances, identifying a set of feature trees includes identifying suitable candidate feature trees stored in a collection of feature trees based on client requirements. In some implementations, identifying the set of feature trees may include determining a plurality of strategic areas and providing one or more feature trees for each strategic area. Strategic areas can include finance, experience, sustainability, inclusion and diversity, and talent to name a few examples. In some cases, one or more feature trees can be created and identified along with the other value trees in the set for a custom strategic area that is not included in the collection of feature trees.

Conversely, feature trees stored in the collection may be updated (or new feature trees created) as feedback from client engagements or projects, as shown by the arrows leading from the user interface 140 to the feature library 120 in FIG. 1. In some cases, the feature trees may be complete in the sense that they include detailed metrics with updated baseline and target values. Other feature trees may be incomplete in the sense that only the higher level objectives are defined, while the actions and metrics may be incomplete. Incomplete feature trees may capture new trends or evolving situations for which the appropriate actions and metrics are not yet fully understood. These updated and newly created feature trees can be identified in subsequent client engagements or used to update ongoing engagements in some instances.

In some implementations, the feature selection engine 130 can identify a set of features 160 relevant for an entity or client by identifying suitable candidate feature trees stored in a collection of feature trees. Candidate feature trees are identified based, e.g., on client requirements. Client requirements are chunks of information that express the client's priorities or concerns related to the engagement or project. Generally speaking, a requirement will correspond to a node within one or more feature trees, although some amount of interpretation is often required to match the client's expression with the exact content of the feature tree node.

Implementations of the present disclosure may select requirements by compiling information associated with the client. Such information can take the form of data, e.g., text data, audio data, image data, or video data, associated with the client (data sources 110 in FIG. 1). The data is "associated with" the client in the sense that that the data is created by the client and/or describes the client and its activities. For example, the data can include meeting minutes or a recording of the meeting conventionally used to capture requirements, but the process draws from a wider range of sources.

In some instances, the information may be publicly available. Publicly available data can include data from a client's website, news releases, earnings calls, social media presence, and technical product documentation (e.g., user manuals) to name a few examples. For example, publicly available data created by the client may refer to a pdf-brochure uploaded to the client's website. An article on the internet site of a trade publication describing a launch of a new product may be an example of third party publicly available information. For the purposes of this disclosure, data created by or provided by the client itself may reflect requirements more accurately than third party data. For example, a news release published by the client itself may be more reliable than a third party social media post that tags the client.

Implementations of this disclosure may also include techniques for identifying and correcting for bias in the collected data. Such techniques may help to prevent manipulation of the underlying model, e.g., by publishing large numbers of crafted articles that may significantly alter the model and model performance. Anti-biasing techniques can include, e.g., data-preprocessing before training, processing during the training itself, or post-processing after training.

Using publicly available information may have the advantage that requirements can be compiled in a periodic manner, at a suitable point in time. For example, requirements can be compiled in preparation for an initial client meeting, which has the potential to shorten the onboarding timeline. In fact, requirements can be compiled independently of client engagements.

In the case of a client engagement, internal information can be used in place of or in addition to publicly available data. Such internal information is generally unavailable outside of the entity of interest. Examples of internal information can include meeting notes, recordings of calls or meetings, internal company memos, pages on the company intranet, technical specifications, and lab notebooks. Such information may be useful for engagements that deal with confidential applications (e.g., product development or product launches) that have not yet been made public.

In some implementations, the data source may include a mix of internal and publicly available information and/or a mix of information created by the client and information written about the client by third parties.

Depending on the format of the raw data, optical character recognition (OCR) and text-to-speech techniques can be used to convert the raw data into text form. For example, an OCR engine such as Tesseract can be used to convert image data into text. In some instances, image data is resized or modified to remove noise and increase contrast to improve OCR accuracy. In some implementations, the extracted text is validated manually (e.g., for a digitized image of handwritten notes on a whiteboard).

The text data is then processed using natural language processing (NLP) techniques. For example, snippets of text may be fed into NLP models, such as a word embedding, using the GloVe algorithm. In some instances, a proprietary dictionary that matches keywords encoded from client data to entries or nodes in the collection of feature trees can be used for NLP processing. NLP processing can create vectors of words that correspond to potential client requirements. As previously described, a requirement will typically correspond to a node within one or more feature trees.

The output of the NLP processing is a list of entity-specific candidate features 150 that may each represent a customer requirement. The list can be used to filter the collection of feature trees. An example of a potential feature extracted from a pdf of a client brochure may be "move to 40% renewable energy sources by 2026." For example, the data from the word embedding may be aggregated to create a list of candidate features. This list may also be validated and stored for later use.

Implementations may identify suitable candidate feature trees in the collection of feature trees based on client requirements, e.g., the list of entity-specific candidate features 150. For example, an AI-based feature selection engine 130 may be used to filter the collection of feature trees comprised by the feature library 120 based on the candidate features 150.

In some instances, the feature trees are grouped within the collection by focus area (e.g., according to strategic objectives), and the feature selection engine 130 is configured to provide at least one candidate feature tree from each of a pre-selected set of focus areas. For example, a user may specify finance, customer or employee experience, sustainability, inclusion and diversity, and talent as focus areas, and the feature selection engine 130 will provide at least one value tree for each strategic area. Another implementation may relate to the design of a hybrid electric vehicle, and the focus areas can include, e.g., chassis, electronics, battery, drivetrain, and vehicle interior. In yet a further example, each focus area can correspond to one step in a process, e.g., deposition, removal, patterning, and the modification of electrical properties in semiconductor manufacturing.

In some cases, the list of candidate features 150 is evaluated in reference to other entities that occupy the same technical or commercial space as the client. For example, a client may be a company in the energy industry. The feature selection engine 130 may be configured to use a machine learning algorithm (e.g., a k-nearest neighbors algorithm) to identify similar companies based on market size, industry, region, revenue segment, and focus areas. The feature selection engine 130 may augment the list of candidate features compiled for the client or weight individual features within the list to more closely reflect the focus of the market as a whole.

In some implementations, the list of candidate features 150 may be used to search within the collection of feature trees and return matching feature trees. For example, the entry for "move to 40% renewable energy sources by 2026" may return all feature trees that relate to renewable energy. Depending on the size of the feature tree collection and the broadness of the candidate feature, the number of feature trees returned by the search may be larger than desired. Thus, in some cases, the feature selection engine 130 may recommend specific features or feature trees for the particular engagement.

Individual features within the feature trees of the collection may be evaluated by creating a single value decomposition (SVD) matrix and applying a weighted score to each feature in the matrix. SVD is a matrix factorization technique that uses a collaborative filtering mechanism and latent factor models to generate recommendations. The weighted score may be determined using explainable AI technology that learns from past engagements, i.e., selection of features and feature trees. The weighted score may account for, e.g., selection of a particular feature by similar clients and a probability of achieving a target metric based on current benchmarks.

For example, a collection of feature trees may depict different designs of a particular vehicle with all its subsystems and their constituent components. An objective of the particular engagement may be to reduce the total vehicle weight. Client-related information may be processed according to the techniques of the disclosure to obtain a candidate list of features, i.e., components, for weight reduction. While it would be possible to simply reduce the weight of the identified features, the recommendation described above can be used to identify feature trees for vehicles similar to the vehicle of interest and identify features within those feature trees that contribute to a weight reduction for those vehicles. In this example, the selected features 160 can be input into a design platform to modify the weight of the associated components.

In some implementations, the feature selection engine 130 may be configured to recommend baseline and target values for each of the recommended features. For example, the feature selection engine 130 may access a database that stores baseline and target values for commonly used features in different industries. The baseline and target values can be updated during an ongoing engagement. For example, a pilot client in a particular industry may initially set a target value of 40% for a given feature. Within a year after the engagement begins, unforeseen circumstances may arise on the market that cause the client's competitors to set a target of 70% for the same feature. In such cases, the feature selection engine 130 may be configured to automatically generate a message containing the updated target for the feature whenever updated target information has been stored and transmit the message to the relevant users for the initial client account.

The system 100 can be configured to generate a graphical user interface 140 that shows the features and/or feature trees selected by the feature selection engine 130. In some instances, the graphical user interface 140 can be used to create a custom feature tree that is not included in the collection of feature trees, i.e., in the feature library 120. In other instances, the user may use the interface 140 to modify portions of a selected feature tree 160, e.g., by adding individual features to or deleting features from an existing tree. The new or modified feature trees may be saved to the feature library 120, as indicated by the corresponding arrow in FIG. 1.

The user interface 140 can also be used to track the progress of the selected features 160 over a period of time. A user can manually update values corresponding to the features 160 via the interface 140. In some examples, machine learning techniques can be used to determine correlations between the selected features 160 and assist the user in updating the values. In other examples, updated values for the features may be entered automatically based on updated information in the data sources 110.

For example, the system 100 can include a correlation engine 190 that is configured to determine correlations between the selected features 160. In some implementations, the correlation engine 190 receives and automatically clusters the selected features 160. For example, clusters of clients can be created using k-means and centroid-based clustering. In some cases, user (e.g., a data scientist) may evaluate whether a given correlation identified by the correlation engine is a valid correlation. In some cases, the evaluation of whether an identified correlation is valid is dependent on a minimum random sample of the correlation. Valid correlations may be saved in a correlation repository. The system 100 can compare an individual client with correlations stored in the correlation repository using an Euclidean distance. An encoder can be used to convert the data into a single numeric vector for comparison. In some instances, the system 100 asks for user input via the interface 140 as to whether the client exhibits a particular correlation identified by the correlation engine 190.

The correlation engine 190 can also find correlation patterns specific to a single client using k-means. The correlation pattern is present within the features selected for the client but is not yet exhibited in the cluster (e.g., across an industry or market segment). The correlation engine 190 can be configured to monitor such correlations until a sufficient sample set within a cluster exhibits the correlation and then save the correlation to the correlation repository.

In some implementations, the feature selection engine 130 is configured to select features based on correlations identified by the correlation engine 190.

Figure 3:
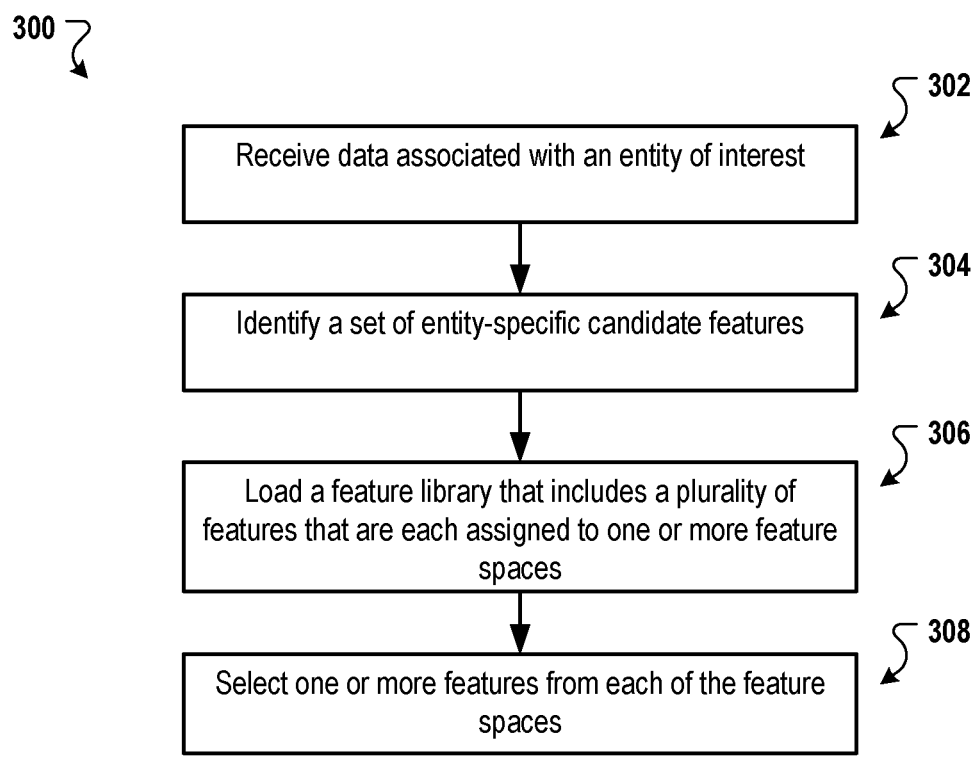
FIG. 3 is a flow diagram of an example process for selecting features.

FIG. 3 is a flow chart of an example process 300 for selecting a set of features for an entity of interest (e.g., a client). The process can be performed, e.g., by the feature selection system 100 of FIG. 1.

The feature selection system 100 receives at least one of text, audio, image, or video data associated with an entity of interest over a network (302). The feature selection system 100 identifies a set of entity-specific candidate features based on the received data (304). In some instances, the feature selection system 100 extracts text from the text, audio, image, or video data associated with the entity and uses a natural language processing (NLP) model to create vectors of feature-related words based on the usage and context of the words in the data associated with the entity. The feature selection system 100 loads a feature library that includes a plurality of features that are each assigned to one or more feature spaces (306). For example, the feature library can include a collection of feature trees as described above. Each feature tree assigns a plurality of features to a given feature space (e.g., focus area). The feature selection system 100 uses a feature selection engine 130 to select one or more features from each of the feature spaces based on the set of entity-specific candidate features (308).

In some implementations, the feature selection engine 130 selects one or more features from each of the feature spaces based both on the set of entity-specific candidate features as well as a set of domain-specific candidate features. In this instance, the feature selection system 100 can receive at least one of text, audio, image, or video data associated with a plurality of entities in addition to the initial entity of interest. Based on the received data, the feature selection system 100 identifies an entity domain that is common to the entity of interest and the plurality of additional entities. For example, the entity domain can encompass a common technology implemented by the entities (e.g., blockchain technology). In other cases, the entity domain can correspond to a particular type of device (plug-in hybrid electric vehicles). In other examples, the entity domain can encompass a particular industry (e.g., the energy industry or the semiconductor manufacturing industry).

Once the entity domain is identified, the feature selection system 100 can load a set of domain-specific candidate features from a domain-specific feature library. The feature selection engine 130 can then select the one or more features from each of the feature spaces based on both the set of entity-specific candidate features and the set of domain-specific candidate features. In some instances, each of the loaded domain-specific candidate features further includes a baseline measure, and the feature selection system 100 identifies a baseline measure for each of the selected features based on the baseline measures of the domain-specific candidate features.

In some instances, the feature selection engine 130 selects a first feature set that includes one or more features from each of the feature spaces based on the set of entity-specific candidate features. Then, at a second time after the first time, the feature selection engine 130 selects a second feature set that includes one or more features from each of the feature spaces based on both the set of entity-specific candidate features and the set of domain-specific candidate features. For example, the second time may be one month, one quarter, or one year after the first time. In some cases, the second feature set can be used to update or overwrite the first feature set. For example, the feature selection engine 130 can continuously select new feature sets at regular intervals after the second time.

In some implementations, the feature selection system 100 uses explainable AI technology to assign a weighted score to each of the selected features and filters the selected features based on the weighted score.

In some cases, the feature selection system 100 can identify one or more custom features comprised by the set of entity-specific candidate features or the set of domain-specific candidate features and not comprised by the feature library and store the one or more custom features in the feature library.

In some implementations a visualization can be generated that presents for each feature space, both the features selected by the feature selection engine 130 and one or more unselected features. The visualization may be presented to a user on a user end device. User input selecting or unselecting one or more of the features can be received, and the selected features can be updated based on the user input.

Figure 4:
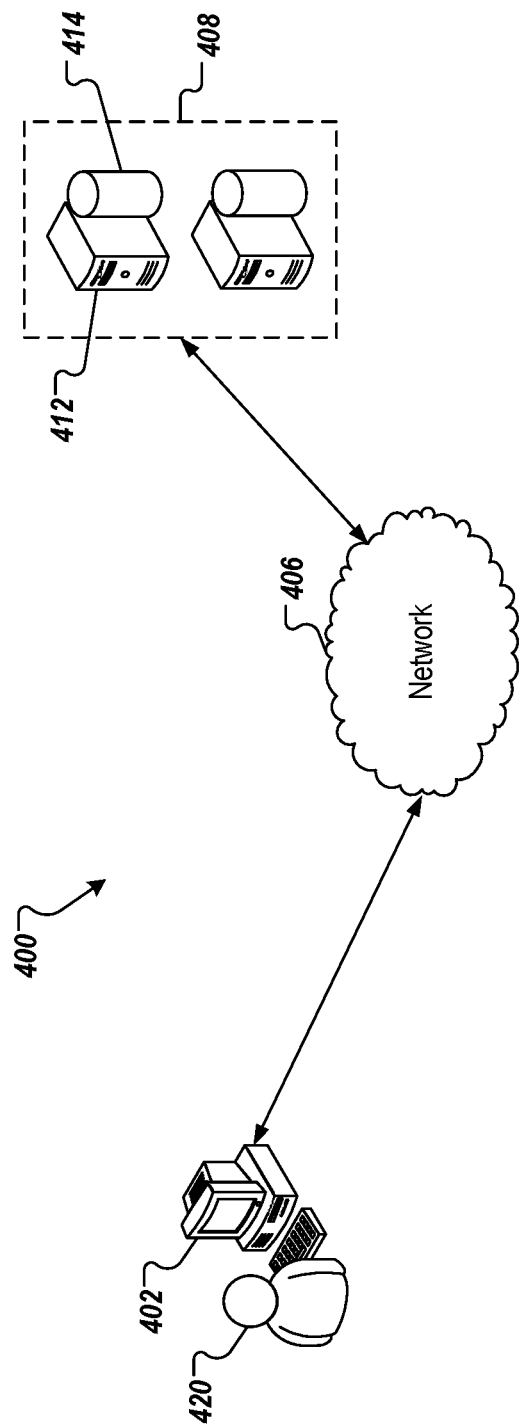
FIG. 4 depicts an example system that can execute implementations of the present disclosure.

FIG. 4 depicts an example system 400 that can execute implementations of the present disclosure. The example system 400 includes a computing device 402, a back-end system 408, and a network 406. In some examples, the network 406 includes a local area network (LAN), wide area network (WAN), the Internet, or a combination thereof, and connects web sites, devices (e.g., the computing device 402), and back-end systems (e.g., the back-end system 408). In some examples, the network 406 can be accessed over a wired and/or a wireless communications link.

In some examples, the computing device 402 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 408 includes at least one server system 412, and data store 414 (e.g., database and knowledge graph structure). In some examples, the at least one server system 412 hosts one or more computer-implemented services that users can interact with using computing devices. For example, the server system 412 can host one or more applications that are provided as part of a feature selection system in accordance with implementations of the present disclosure. For example, a user 420 (e.g., a vendor) can interact with the feature selection system using the computing device 402. In some examples, the user 420 can provide data associated with an entity of interest to select one or more features using a feature selection engine, as described in further detail herein. In some examples, the user 420 can create or update one or more feature trees, as described in further detail herein. In some cases, the updated or new feature tree(s) may be transmitted to the enterprise resource planning system 180 of FIG. 1.

The enterprise resource planning (ERP) system 180 of FIG. 1 can be implemented as a software system for collecting, storing, managing, and interpreting data from across a business's various departments, e.g., manufacturing, purchasing, accounting, sales and marketing, human resources, etc. For instance, the ERP system 180 can be used to share data collected across various different user platforms across the different departments of the business. Data collected by one department is often stored locally on a computer or server in a non-standard format dictated by the hardware or software platform used by that department. Such differences can lead to fragmented or incomplete data that the ERP system cannot process in real time. Conversely, some instances of data may be duplicative, overtaxing the processors of the ERP system and consuming unnecessary bandwidth to transmit the data.

For example, the ERP system may have data relating to batteries for hybrid electric vehicles and data relating drivetrains for hybrid electric vehicles. If such data cannot be consolidated due to format inconsistencies, the ERP system may be unable to schedule manufacturing steps to install a battery in each of a series of vehicles. Similarly, if the data is kept in separate locations and cannot be timely or readily-shared across the ERP system, difficulties in production planning may occur. In some instances, efforts to consolidate data from such noncanonical or incomplete records may lead to production errors, e.g., the wrong battery being installed in the wrong vehicle. Implementations of the present disclosure may address these and other issues by collecting, converting, and consolidating information across the ERP system into a standardized format. Although FIG. 1 depicts the system 100 and the ERP system 180 as separate entities, in some implementations, the system 100 can be integrated directly into the ERP system 180 itself.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
   receiving, over a network, at least one of text, audio, image, or video data associated with a plurality of entities including an entity of interest;
   identifying, based on the received data, a set of entity-specific candidate features;
   identifying, based on the received data, an entity domain comprising the plurality of entities;
   loading a feature library comprising a plurality of features that are each assigned to one or more feature spaces;
   loading a set of domain-specific candidate features from a domain-specific feature library for the entity domain; and
   selecting, using a feature selection engine, (i) at a first time, a first feature set comprising one or more features from each of the feature spaces based on the set of entity-specific candidate features, and (ii) at a second time after the first time, a second feature set comprising one or more features from each of the feature spaces based on the set of entity-specific candidate features and the set of domain-specific candidate features;
   assigning, using explainable AI technology, a weighted score to each of the selected features of the first feature set and the second feature set;
   filtering the selected features of the first feature set and the second feature set based on the weighted scores;
   receiving a user input selecting one or more particular filtered features of the first feature set and the second feature set, through a visualization that presents the filtered features and that enables selection of individual filtered features; and
   updating the explainable AI technology to learn from the user input that selects the one or more particular filtered features, in generating future weighted scores for features in connection with other engagements of entities that are similar to the entity of interest.

2. The computer-implemented method of claim 1, wherein identifying the set of entity-specific candidate features comprises:
   extracting text from the text, audio, image, or video data associated with the entity; and
   creating, using a natural language processing (NLP) model, vectors of feature-related words based on the usage and context of the words in the data associated with the entity.

3. The computer-implemented method of claim 1, wherein each of the loaded domain-specific candidate features further comprises a baseline measure, the method further comprising: for each of the selected features, identifying a baseline measure based on the baseline measures of the domain-specific candidate features.

4. The computer-implemented method of claim 1, further comprising: identifying one or more custom features comprised by the set of entity-specific candidate features or the set of domain-specific candidate features and not comprised by the feature library; and storing the one or more custom features in the feature library.

5. A system, comprising:
   one or more processors; and
   a computer-readable storage device coupled to the one or more processors and having instructions stored thereon which, when executed by the one or more processors, cause the one or more processors to perform operations comprising:
   receiving, over a network, at least one of text, audio, image, or video data associated with a plurality of entities including an entity of interest;
   identifying, based on the received data, a set of entity-specific candidate features;
   identifying, based on the received data, an entity domain comprising the plurality of entities;
   loading a feature library comprising a plurality of features that are each assigned to one or more feature spaces;
   loading a set of domain-specific candidate features from a domain-specific feature library for the entity domain; and
   selecting, using a feature selection engine, (i) at a first time, a first feature set comprising one or more features from each of the feature spaces based on the set of entity-specific candidate features, and (ii) at a second time after the first time, a second feature set comprising one or more features from each of the feature spaces based on the set of entity-specific candidate features and the set of domain-specific candidate features;
   assigning, using explainable AI technology, a weighted score to each of the selected features of the first feature set and the second feature set;
   filtering the selected features of the first feature set and the second feature set based on the weighted scores;
   receiving a user input selecting one or more particular filtered features of the first feature set and the second feature set, through a visualization that presents the filtered features and that enables selection of individual filtered features; and
   updating the explainable AI technology to learn from the user input that selects the one or more particular filtered features, in generating future weighted scores for features in connection with other engagements of entities that are similar to the entity of interest.

6. The system of claim 5, wherein identifying the set of entity-specific candidate features comprises:
   extracting text from the text, audio, image, or video data associated with the entity; and creating, using a natural language processing (NLP) model, vectors of feature-related words based on the usage and context of the words in the data associated with the entity.

7. The system of claim 5, wherein each of the loaded domain-specific candidate features further comprises a baseline measure, the operations further comprising: for each of the selected features, identifying a baseline measure based on the baseline measures of the domain-specific candidate features.

8. The system of claim 5, wherein the operations further comprise: identifying one or more custom features comprised by the set of entity-specific candidate features or the set of domain-specific candidate features and not comprised by the feature library; and storing the one or more custom features in the feature library.

9. Computer-readable storage media coupled to the one or more processors and having instructions stored thereon which, when executed by the one or more processors, cause the one or more processors to perform operations comprising:
   receiving, over a network, at least one of text, audio, image, or video data associated with a plurality of entities including an entity of interest;
   identifying, based on the received data, a set of entity-specific candidate features;
   identifying, based on the received data, an entity domain comprising the plurality of entities;
   loading a feature library comprising a plurality of features that are each assigned to one or more feature spaces;
   loading a set of domain-specific candidate features from a domain-specific feature library for the entity domain; and
   selecting, using a feature selection engine, (i) at a first time, a first feature set comprising one or more features from each of the feature spaces based on the set of entity-specific candidate features, and (ii) at a second time after the first time, a second feature set comprising one or more features from each of the feature spaces based on the set of entity-specific candidate features and the set of domain-specific candidate features;
   assigning, using explainable AI technology, a weighted score to each of the selected features of the first feature set and the second feature set;
   filtering the selected features of the first feature set and the second feature set based on the weighted scores;
   receiving a user input selecting one or more particular filtered features of the first feature set and the second feature set, through a visualization that presents the filtered features and that enables selection of individual filtered features; and
   updating the explainable AI technology to learn from the user input that selects the one or more particular filtered features, in generating future weighted scores for features in connection with other engagements of entities that are similar to the entity of interest.

10. The storage media of claim 9, wherein identifying the set of entity-specific candidate features comprises:
   extracting text from the text, audio, image, or video data associated with the entity; and
   creating, using a natural language processing (NLP) model, vectors of feature-related words based on the usage and context of the words in the data associated with the entity.

* * * * *